United States Patent
Hsieh et al.

(10) Patent No.: US 10,680,252 B2
(45) Date of Patent: Jun. 9, 2020

(54) CATALYST LAYER MATERIAL AND MEMBRANE ELECTRODE ASSEMBLY INCLUDING SAME

(71) Applicant: National Taiwan University of Science and Technology, Taipei (TW)

(72) Inventors: Bing-jen Hsieh, Taipei (TW); Bing-joe Hwang, Taipei (TW); Meng-che Tsai, Taipei (TW); Wei-nien Su, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 220 days.

(21) Appl. No.: 16/024,861

(22) Filed: Jul. 1, 2018

(65) Prior Publication Data
US 2019/0237771 A1 Aug. 1, 2019

(30) Foreign Application Priority Data

Feb. 1, 2018 (TW) .............................. 107103687 A

(51) Int. Cl.
*H01M 4/92* (2006.01)
*H01M 4/88* (2006.01)
(Continued)

(52) U.S. Cl.
CPC ......... *H01M 4/925* (2013.01); *H01M 4/8807* (2013.01); *H01M 4/921* (2013.01); *H01M 8/1004* (2013.01)

(58) Field of Classification Search
CPC ............ H01M 8/02; H01M 8/10; H01M 4/92; H01M 4/88; H01M 4/925
See application file for complete search history.

(56) References Cited

U.S. PATENT DOCUMENTS

| 2014/0004444 | A1* | 1/2014 | Cerri | H01M 4/92 429/487 |
| 2014/0193746 | A1* | 7/2014 | Cerri | B01J 21/06 429/524 |
| 2017/0373323 | A1 | 12/2017 | Ho et al. | |

FOREIGN PATENT DOCUMENTS

TW 201312843 3/2013

OTHER PUBLICATIONS

Devina Pillay and Michelle D. Johannes, "A First Principles Study of the Effects of Sulfur Adsorption on the Activity of Pt, Ni and Pt3Ni", AIChE, The 2007 Annual Meeting, Salt Lake City, UT, Nov. 5, 2007. Retrieved online on Jan. 17, 2020 from: https://aiche.confex.com/aiche/2007/techprogram/P85825.HTM.*

(Continued)

*Primary Examiner* — Kenneth J Douyette

(57) ABSTRACT

A catalyst layer material and a membrane electrode assembly (MEA) having same are provided. The catalyst layer material used for a fuel cell has a catalyst support and a catalyst distributed on the catalyst support. The catalyst support has $Ti_WM_XN_YO_Z$, wherein Ti is titanium; M is one metal element selected from a group consisting of group IB metals, group IIA metals, group IIB metals, group VB metals, group VIB metals, group VIIB metals and group VIIIB metals; N is an non-metal element selected from a group consisting of nitrogen, phosphorus, and sulfur; O is oxygen; $0<W\leq1$; $0<X\leq0.5$; $0<Y\leq0.2$; $1.5\leq Z\leq2.0$. By applying a non-carbon catalyst support doped with metal cations and anions to the membrane electrode assembly, stability and performance of the fuel cell can be effectively enhanced.

10 Claims, 4 Drawing Sheets

(51) Int. Cl.
   H01M 8/10    (2016.01)
   H01M 8/1004  (2016.01)

(56) References Cited

OTHER PUBLICATIONS

Aviles-Garcia et al. "W and Mo Doped TiO2: Synthesis, Characterization and Photocatalytic Activity", Fuel, 198: 31-41, Available Online Oct. 17, 2016.

Ho et al. "Nanostructured Ti[0.7]Mo[0.3]O2 Support enhances Electron Transfer to Pt: High-Performance Catalyst for Oxygen Reduction Reaction", Journal of the American Chemical Society, 133(30): 11716-11724, Published Online Jun. 27, 2011.

Ho et al. "Robust Non-Carbon Ti[0.7]Ru[0.3]O2 Support With Co-Catalytic Functionality for Pt: Enhances Catalytic Activity and Durability for Fuel Cells", Energy & Environmental Science, 4(10): 4194-4200, 2011.

Li et al. "A Direct Synthesis of B-Doped TiO2 and Its Photocatalytic Performance on Degradation of RhB", Applied Surface Science, 265: 36-40, Available Online Nov. 5, 2012.

Liu et al. "Large-Scale Synthesis of Transition-Metal-Doped TiO2 Nanowires With Controllable Overpotential", Journal of the American Chemical Society, JACS, 135(27): 9995-9998, Published Online Jul. 1, 2013.

Wu et al. "Synthesis and Characterization of Carbon-Doped TiO2 Nanostructures With Enhanced Visible Light Response", Chemistry of Materials, 19(18): 4530-4537, Published on Web Aug. 15, 2007.

Yang et al. "Preparation of Highly Visible-Light Active N-Doped TiO2 Photocatalyst", Journal of Materials Chemistry, 20(25): 5301-5309, Advance Publication May 24, 2010.

Hsieh et al. "Platinum Loaded on Dual-Doped TiO2 as an Active and Durable Oxygen Reduction Reaction Catalyst", NPG Asia Materials, 9(7): e403-1-e403-8, Published Online Jul. 7, 2017.

* cited by examiner

US 10,680,252 B2

CATALYST LAYER MATERIAL AND MEMBRANE ELECTRODE ASSEMBLY INCLUDING SAME

RELATED APPLICATION

This application claims the benefit of priority of Taiwan Patent Application No. 107103687 filed Feb. 1, 2018, the contents of which are incorporated herein by reference in their entirety.

FIELD AND BACKGROUND OF THE INVENTION

The present disclosure relates to an electrochemical field, and more particularly to a catalyst layer material and a membrane electrode assembly (MEA) including same.

Development and application of energy has always been an indispensable issue in human life, but the destruction of the environment by the development and application of traditional energy sources is increasing day by day. Use of fuel cell technology to generate energy has high efficiency, low noise, and pollution-free advantages, which is in line with energy technology trends.

Fuel cells are basically power generating devices that convert chemical energy into electrical energy using a reverse reaction of water electrolysis. The fuel cells can be distinguished from many species. Commonly used are proton exchange membrane fuel cells (PEMFC) and direct methanol fuel cells (DMFC). Cell stack modules of the fuel cells mainly include membrane electrode assemblies (MEA). Each of the membrane electrode assemblies is composed of a proton exchange membrane, an anode catalyst layer, a cathode catalyst layer, an anode gas diffusion layer (GDL), and a cathode gas diffusion layer. The anode catalyst layer and the cathode catalyst layer are respectively disposed on two sides of the proton exchange membrane, and the anode gas diffusion layer and the cathode gas diffusion layer are respectively disposed on further outer sides of the anode catalyst layer and the cathode catalyst layer.

In the fuel cells, the role of a catalyst support of the anode catalyst layer or the cathode catalyst layer is often neglected. In general, the current technology generally uses various types of carbon as a catalyst support. However, in actuality, even in the application of general fuel cells, problems such as electrochemical corrosion of the carbonaceous catalyst support may easily occur due to repeated turn-on/turn-off operations or high-potential operation. Therefore, the performance and stability of fuel cells is affected.

As a result, it is necessary to provide a novel catalyst layer material to solve the problems existing in the conventional technologies, as described above.

SUMMARY OF THE INVENTION

An object of the present disclosure is to provide a catalyst layer material and a membrane electrode assembly including the same, which is to improve electrical conductivity of a catalyst support by co-doping metal cations and anions into $TiO_2$. Further, the electronic interaction between the catalyst and the catalyst support can be better utilized to achieve the purpose of enhancing catalytic activity.

To achieve the above object, the present disclosure provides a catalyst layer material for a fuel cell, including:
a catalyst support comprising $Ti_WM_XN_YO_Z$, wherein Ti is titanium; M is one metal element selected from a group consisting of group IB metals, group IIA metals, group IIB metals, group VB metals, group VIB metals, group VIIB metals and group VIIIB metals; N is an non-metal element selected from a group consisting of nitrogen, phosphorus, and sulfur; O is oxygen; $0<W\leq1$; $0<X\leq0.5$; $0<Y\leq0.2$; $1.5\leq Z\leq2.0$; and
a catalyst distributed on the catalyst support.

Further, the present disclosure further provides a membrane electrode assembly for a fuel cell, including:
a first gas diffusion layer and a second gas diffusion layer;
a first catalyst layer and a second catalyst layer both disposed between the first gas diffusion layer and the second gas diffusion layer, wherein at least one of the first gas diffusion layer and the second gas diffusion layer includes a catalyst layer material comprising:
a catalyst support comprising $Ti_QM_XN_YO_Z$, wherein Ti is titanium; M is one metal element selected from a group consisting of group IB metals, group IIA metals, group IIB metals, group VB metals, group VIB metals, group VIIB metals and group VIIIB metals; N is an non-metal element selected from a group consisting of nitrogen, phosphorus, and sulfur; O is oxygen; $0<W\leq1$; $0<X\leq0.5$; $0<Y\leq0.2$; $1.5\leq Z\leq2.0$; and
a catalyst distributed on the catalyst support; and a polymer film disposed between the first catalyst layer and the second catalyst layer.

In one embodiment of the present disclosure, $W=1-X$.

In one embodiment of the present disclosure, $Ti_WM_XN_YO_Z$ includes $Ti_{0.8}W_{0.2}N_YO_Z$ or $Ti_{0.9}Nb_{0.1}N_YO_Z$.

In one embodiment of the present disclosure, the group IB metals are selected from a group consisting of copper (Cu), silver (Ag), and gold (Au); the group IIA metal is strontium (Sr); the group IIB metals are selected from a group consisting of zinc (Zn) and cadmium (Cd); the group VB metal is niobium (Nb); the group VIB metals are selected from a group consisting of chromium (Cr), molybdenum (Mo), and tungsten (W); the group VIIB metals are selected from a group consisting of manganese (Mn), technetium (Tc), and rhenium (Re); and the group VIIIB metals are selected from a group consisting of iron (Fe), ruthenium (Ru), osmium (Os), cobalt (Co), rhodium (Rh), iridium (Ir), nickel (Ni), and palladium (Pd).

In one embodiment of the present disclosure, the catalyst includes platinum or a platinum alloy.

Compared with the conventional technologies, the present disclosure provides a catalyst layer material and a membrane electrode assembly comprising the same, which is to improve electrical conductivity of a catalyst support by co-doping metal cations and anions into $TiO_2$. Further, the electronic interaction between the catalyst and the catalyst support can be better utilized to achieve the purpose of enhancing catalytic activity.

DESCRIPTION OF SPECIFIC EMBODIMENTS OF THE INVENTION

The structure and the technical means adopted by the present disclosure to achieve the above and other objects can be best understood by referring to the following detailed description of the preferred embodiments and the accompanying drawings. Furthermore, directional terms described by the present disclosure, such as upper, lower, front, back, left, right, inner, outer, side, longitudinal/vertical, transverse/ horizontal, and etc., are only directions by referring to the accompanying drawings, and thus the used directional terms are used to describe and understand the present disclosure, but the present disclosure is not limited thereto.

Figure 1:
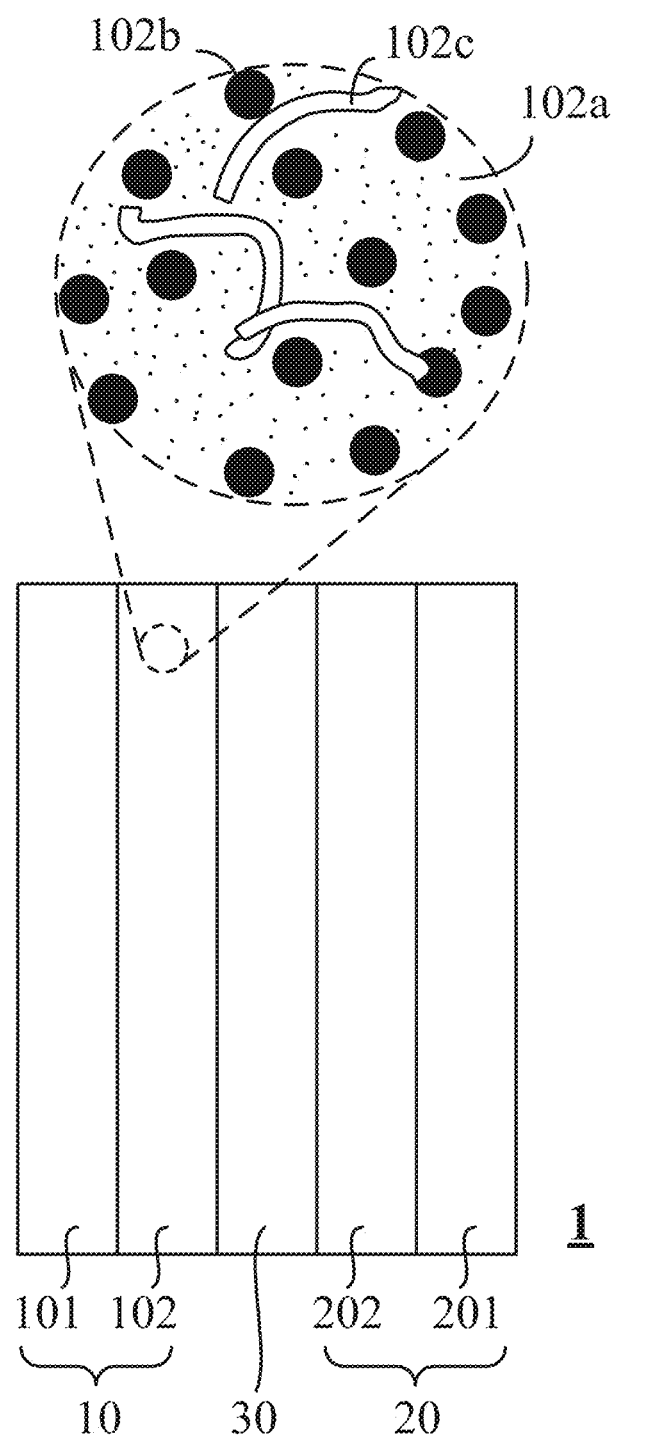
FIG. 1 illustrates a cross-sectional diagram of a membrane electrode assembly in accordance with an embodiment of the present disclosure.

Refer to FIG. 1, which illustrates a cross-sectional diagram of a membrane electrode assembly 1 in accordance with an embodiment of the present disclosure. The membrane electrode assembly 1 includes a first electrode 10, a second electrode 20, and a polymer film 30. The polymer film 30 is sandwiched between the first electrode 10 and the second electrode 20. The polymer film 30 can be selected according to the type of the fuel cell.

The first electrode 10 includes a first gas diffusion layer 101 and a first catalyst layer 102. The second electrode 20 includes a second gas diffusion layer 201 and a second catalyst layer 202. The first catalyst layer 102 is sandwiched between the first gas diffusion layer 101 and the polymer film 30. The second catalyst layer 202 is sandwiched between the second gas diffusion layer 201 and the polymer film 30.

In one embodiment, the first gas diffusion layer 101 and the second gas diffusion layer 201 include porous conductor materials. Therefore, the first gas diffusion layer 101 and the first catalyst layer 102 can be regarded as the first electrode 10 (gas diffusion electrode) of the membrane electrode assembly 1, and the second gas diffusion layer 201 and the second catalyst layer 202 can be regarded as the second electrode 20 of the membrane electrode assembly 1. The first electrode 10 is, for example, an anode electrode, and the second electrode 20 is, for example, a cathode electrode. Components such as the first gas diffusion layer 101, the second gas diffusion layer 201 and the polymer film 30 are well known to those skilled in the art, and their materials and forming methods will not be repeated here.

It is noted that, as shown in the partially enlarged schematic diagram of FIG. 1, at least one of the first catalyst layer 102 and the second catalyst layer 202 includes the catalyst layer material according to one embodiment of the present disclosure. The catalyst layer material includes a catalyst support 102a and a catalyst 102b, and the catalyst 102b is distributed on the catalyst support 102a. Specifically, the catalyst support 102a mainly includes $Ti_WM_XN_YO_Z$, where Ti is titanium, M is contributed by doping cation, N is contributed by doping anions, O is oxygen, and $0<W\leq1$; $0<X\leq0.5$; $0<Y\leq0.2$; $1.5\leq Z\leq2.0$. The doped anions at least provide the following technical effects of: (1) inhibiting the growth of platinum nanoparticles; (2) increasing the surface area of the support; (3) increasing the electrical conductivity; (4) enhancing the stability; and (5) improving the electrochemical activity. Further, W=1-X, which means that $Ti_WM_XN_YO_Z$ is $Ti_{1-X}M_XN_YO_Z$. The BET surface area of the catalyst support 102a is, for example, about 200 m$^2$ g$^{-1}$ to 300 m$^2$ g$^{-1}$. In addition, the catalyst 102b includes platinum (Pt) or a platinum alloy, where the catalyst 102b is, for example, uniformly distributed on the catalyst support 102a in the form of nano-particles.

M is, for example, a metal element of high electrical conductivity with an electrical conductivity of about $10^4$ S/cm to about $10^6$ S/cm. In detail, M is one metal element selected from a group consisting of group IB metals, group IIA metals, group IIB metals, group VB metals, group VIB metals, group VIIB metals and group VIIIB metals. The group IB metals are selected from a group consisting of copper (Cu), silver (Ag), and gold (Au). The group IIA metal is strontium (Sr). The group IIB metals are selected from a group consisting of zinc (Zn) and cadmium (Cd). The group VB metal is niobium (Nb). The group VIB metals are selected from a group consisting of chromium (Cr), molybdenum (Mo), and tungsten (W). The group VIIB metals are selected from a group consisting of manganese (Mn), technetium (Tc), and rhenium (Re). The group VIIIB metals are selected from a group consisting of iron (Fe), ruthenium (Ru), osmium (Os), cobalt (Co), rhodium (Rh), iridium (Ir), nickel (Ni), and palladium (Pd). Additionally, N is a non-metal element selected from a group consisting of nitrogen, phosphorus, and sulfur.

In one embodiment, the catalyst layer material further includes a macromolecular polymer 102c distributed on the catalyst support 102a. For example, the same or similar material as the polymer film 30 can be used as the macromolecular polymer 102c in the catalyst layer material so as to enable the first catalyst layer 102 or the second catalyst layer 202 to combine with the adjacent polymer film 30 more easily. The macromolecular polymer 102c consists of at least one of macromonomer, macromolecular polymer, or macromolecule powder having proton conducting property. The macromolecular polymer 102c may be made of the same or similar constituent material as the macromolecular film 30, such as Nafion® 212 or Nafion® 117 commercially available from Du Pont company.

The catalyst layer material of the above embodiment can be used on the anode catalyst layer or the cathode catalyst layer on demand. Taking the direct methanol fuel cell as an example, when the catalyst layer material is used for the anode catalyst layer, the catalyst layer material mainly performs a methanol oxidation reaction (MOR); when the catalyst layer material is used for the cathode catalyst layer, the catalyst layer material mainly performs an oxygen reduction reaction (ORR).

It is noted that since the material of the catalyst layer used in the membrane electrode assembly 1 includes $Ti_WM_XN_YO_Z$ as the catalyst support 102a, which has a particle size of about several nanometers and has a porous property. Therefore, it is possible to increase the dispersibility and loading of the catalyst 102b due to having a high surface area. The thickness of the electrode can be further reduced, and the effect of reducing the mass transfer resistance during use can be induced. Moreover, due to $Ti_WM_XN_YO_Z$ catalyst support doped with the metal element M having high electrical conductivity, it can further improve the electrical conductivity of the catalytic layer. In addition, generally, in the methanol oxidation reaction, the catalyst is easily occupied by incompletely reacted carbon monoxide (CO), so that so-called "poisoning effect" gradually occurs, i.e. the catalyst loses its original activity. When a suitable metal M is selected as the catalyst support $Ti_WM_XN_YO_Z$, hydroxyl ion (—OH) can be supplied by the metal M to CO absorbed on the catalyst surface, so as to promote the CO to react and to become carbon dioxide ($CO_2$), and the carbon dioxide leaves the catalyst surface. It is therefore possible to slow down or suppress the so-called CO poisoning effect. In this way, when $Ti_WM_XN_YO_Z$ is used as the support material, it is not only a good conductor of metal M that can conduct electrons but also greatly enhances the catalytic activity or anti-CO poisoning effect, so that the characteristics of $Ti_WM_XN_YO_Z$ as a support can be met in many aspects demand.

Although the first catalyst layer 102, including $Ti_WM_XN_YO_Z$ as a catalyst support layer material, is taken as an example in the embodiment shown in FIG. 1, the present disclosure is not limited thereto. That is, as far as the material of at least one of the first catalyst layer 102 and the second catalyst layer 202 includes $Pt/Ti_WM_xN_yO_Z$ or Pt alloy/$Ti_WM_xN_yO_Z$, which is within the scope of the present disclosure. Those skilled in the art can know the application and the changes according to the foregoing embodiments, and thus will not be described in detail herein.

The catalyst support 102a of the present disclosure can be prepared by a method such as a hydrothermal method, a thermal dissolution method or a solid solution method, but the present disclosure is not limited thereto. Hereinafter, two specific embodiments are described based on the hydrothermal method to explain the preparation method of the catalyst support 102a.

Embodiment 1: Preparation of $Ti_{0.8}W_{0.2}N_yO_Z$

A method for preparing $Ti_{0.8}W_{0.2}N_yO_Z$ nanoparticles is described below. First, 0.186 grams (g) of $WCl_6$ was added into 2 milliliters (ml) of 99.5% ethanol to fabricate a $WCl_6$ solution. 60 ml of 95% ethanol was cooled to 8° C., and then the $WCl_6$ solution and 0.208 ml of $TiCl_4$ were added into the 60 ml of 95% ethanol to form a first mixed solution. The first mixed solution was stirred for 5 minutes. Next, 0.6 g of $(NH_2)_2CO$ was added into the first mixed solution to form a second mixed solution. The second mixed solution was stirred for 5 minutes. Next, the second mixed solution was placed in an autoclave and heated to 150° C. for 2 hours, and then naturally cooled to room temperature. After completion of the reaction, the suspension was washed with deionized water and the product was collected by multiple centrifugations until the pH of the wash solution was 7. The $Ti_{0.8}W_{0.2}N_yO_Z$ nanoparticles were obtained by drying the precipitate at 80° C. overnight (over 8 hours) using a vacuum oven.

Embodiment 2: Preparation of $Ti_{0.9}Nb_{0.1}N_yO_Z$

A method for preparing $Ti_{0.9}Nb_{0.1}N_yO_Z$ nanoparticles is described below. First, 0.0632 g of $NbCl_5$ was added into 2 ml of 99.5% ethanol to fabricate an $NbCl_5$ solution. 60 ml of 95% ethanol was cooled to 8° C., and then the $NbCl_5$ solution and 0.234 ml of $TiCl_4$ were added into the 60 ml of 95% ethanol to form a first mixed solution. The first mixed solution was stirred for 5 minutes. Next, 0.6 g of $(NH_2)_2CO$ was added into the first mixed solution to form a second mixed solution. The second mixed solution was stirred for 5 minutes. Next, the second mixed solution was placed in an autoclave and heated to 150° C. for 2 hours, and then naturally cooled to room temperature. After completion of the reaction, the suspension was washed with deionized water and the product was collected by multiple centrifugations until the pH of the wash solution was 7. The $Ti_{0.9}Nb_{0.1}N_yO_Z$ nanoparticles were obtained by drying the precipitate at 80° C. overnight (over 8 hours) using a vacuum oven.

In addition to the above $Ti_{0.8}W_{0.2}N_yO_Z$ and $Ti_{0.9}Nb_{0.1}N_yO_Z$, samples of $TiO_2$, $TiN_yO_Z$, $Ti_{0.8}W_{0.2}O_Z$, and $Ti_{0.9}Nb_{0.1}O_Z$ are further provided for comparison. The electrical conductivity and BET surface area were tested for these materials and the resulting data of electrical conductivity and BET surface area are shown in Table 1 below.

TABLE 1

| Sample | | Electrical conductivity (S/cm) | BET surface area (m²/g) |
| --- | --- | --- | --- |
| Embodiment 1 | $Ti_{0.8}W_{0.2}N_yO_Z$ | 2.13 | 190.5 |
| Embodiment 2 | $Ti_{0.9}Nb_{0.1}N_yO_Z$ | 0.312 | 240.2 |
| Comparative example 1 | $TiO_2$ | $8.9 \times 10^{-6}$ | 50 |
| Comparative example 2 | $TiN_yO_Z$ | $5.5 \times 10^{-3}$ | 194 |
| Comparative example 3 | $Ti_{0.8}W_{0.2}O_Z$ | $3.32 \times 10^{-1}$ | 115.6 |
| Comparative example 4 | $Ti_{0.9}Nb_{0.1}O_Z$ | $4.47 \times 10^{-2}$ | 178.6 |

From the results of the above Embodiments 1 and 2, in comparison with Comparative examples 1 to 4, it can be seen that the electrical conductivity and the BET surface area of the catalyst support 102a can be drastically improved by co-doping cations and anions with $TiO_2$. In the comparison of Embodiment 1 and Comparative example 3, the addition of anions led to an increase in electrical conductivity from $3.32 \times 10^{-1}$ S/cm to 2.13 S/cm, and a BET surface area from 115.6 m²/g to 190.5 m²/g. In the comparison of Embodiment 2 and Comparative example 4, the addition of anions led to an increase in electrical conductivity from $4.47 \times 10^{-2}$ S/cm to 0.312 S/cm, and a BET surface area from 178.6 m²/g to 240.2 m²/g.

Further, a method of depositing a platinum catalyst is as follows: 2.56 mL of 50 mM $H_2PtCl_6$ (hexachloroplatinic acid) was added into 20 mL of ethylene glycol to form a light yellow solution. Then, 0.100 g of $Ti_{0.8}W_{0.2}N_yO_Z$ nanoparticles, $Ti_{0.9}Nb_{0.1}N_yO_Z$ nanoparticles, $TiN_yO_Z$ nanoparticles, $Ti_{0.8}W_{0.2}O_Z$ nanoparticles, or $Ti_{0.9}Nb_{0.1}O_Z$ nanoparticles were respectively mixed to the above-mentioned hexachloroplatinic acid for 30 minutes using an ultrasonic wave, followed by adding 0.8 M sodium hydroxide to the mixed solution to adjust the pH to 11.0. The suspension was exposed to a 150 W microwave oven and heated at 165° C. for 1 hour. When the reaction is complete, the sample is cooled in air. Then, a black precipitate can be collected by repeating centrifugation and washing with acetone and deionized water. Subsequently, the catalyst layer material of $Pt/Ti_{0.8}W_{0.2}N_yO_Z$, $Pt/Ti_{0.9}Nb_{0.1}N_yO_Z$, $Pt/TiN_yO_Z$, $Pt/Ti_{0.8}W_{0.2}O_Z$ or $Pt/Ti_{0.9}Nb_{0.1}O_Z$ can be obtained by drying in a vacuum oven at 80° C. 1OZ catalyst layer material.

Figure 2:
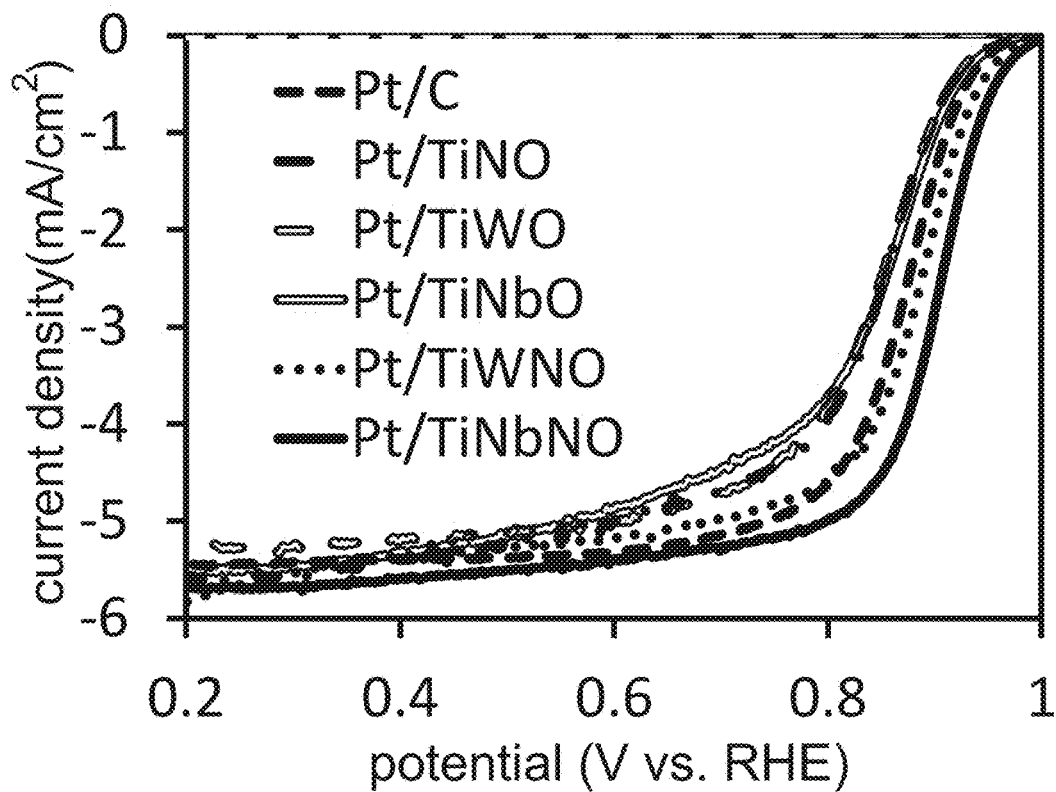
FIGS. 2, 3, 4, 5, 6 and 7 illustrate comparative diagrams of oxygen reduction reaction polarization curve (FIGS. 2 and 4-6) and mass activity (FIGS. 3 and 7; 0.9V vs. RHE (ik)) of each of the catalyst layer materials.
Figure 3:
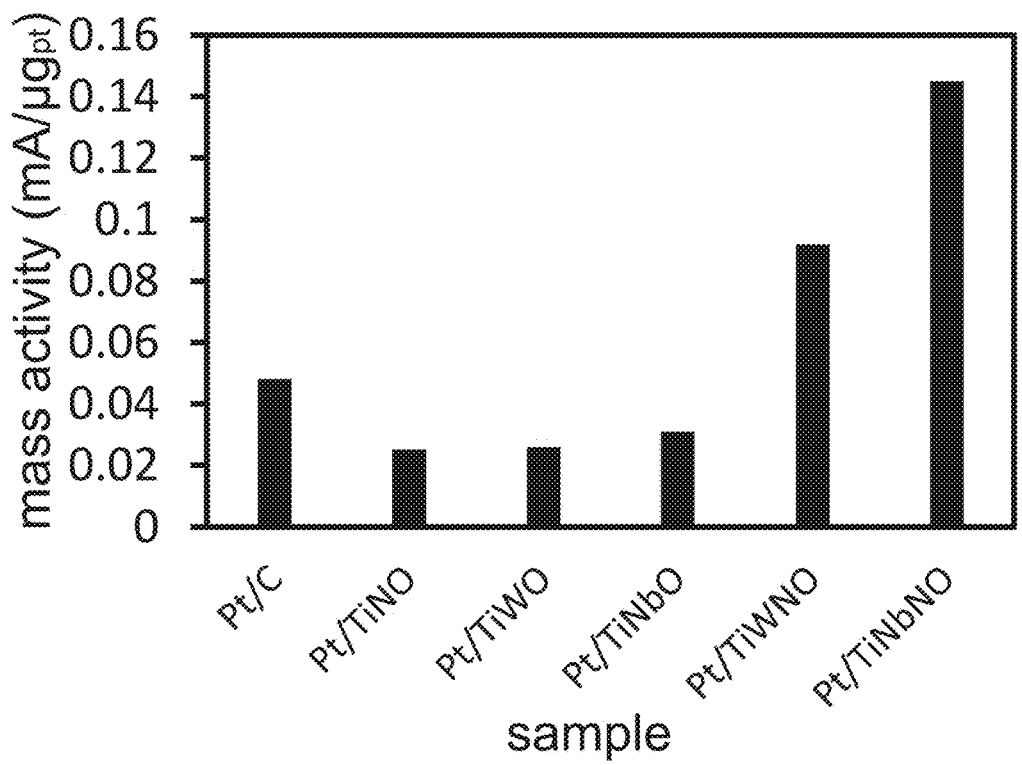
Figure 4:
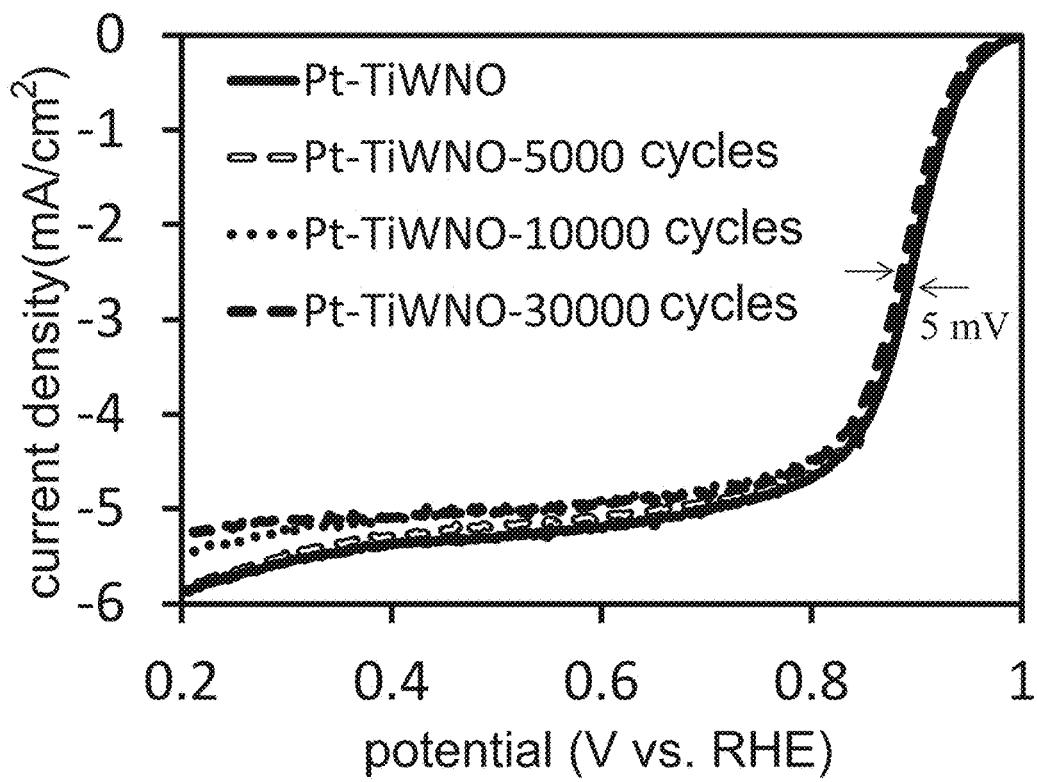
Figure 5:
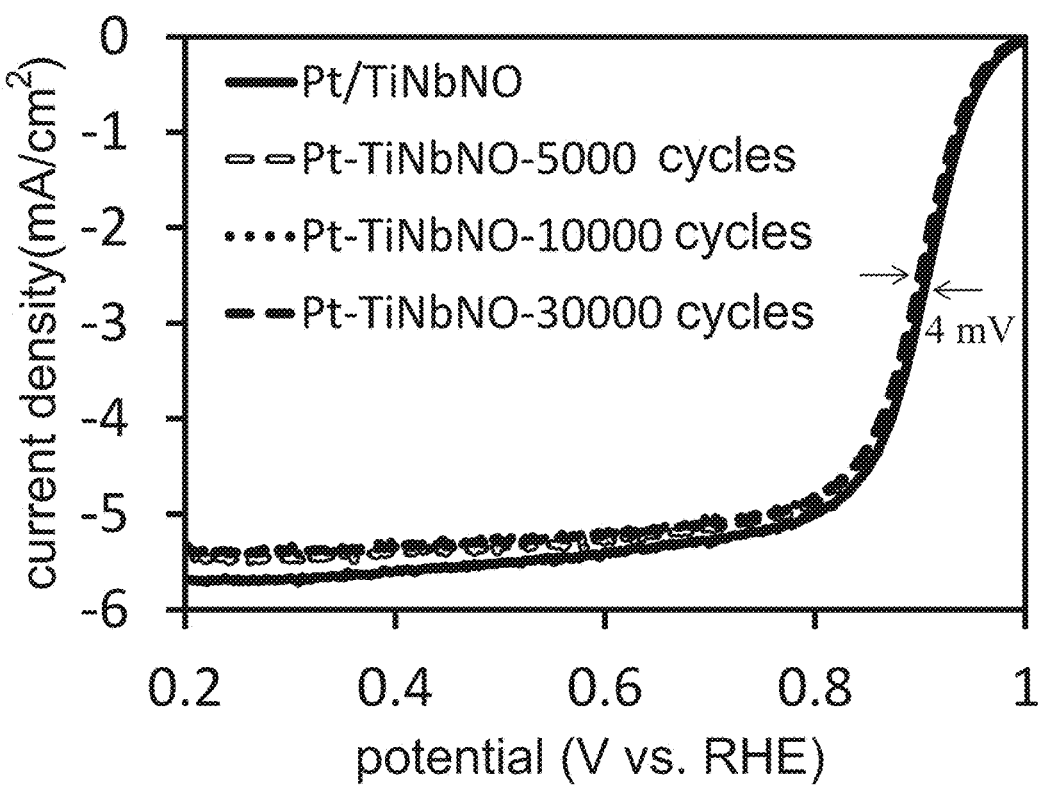
Figure 6:
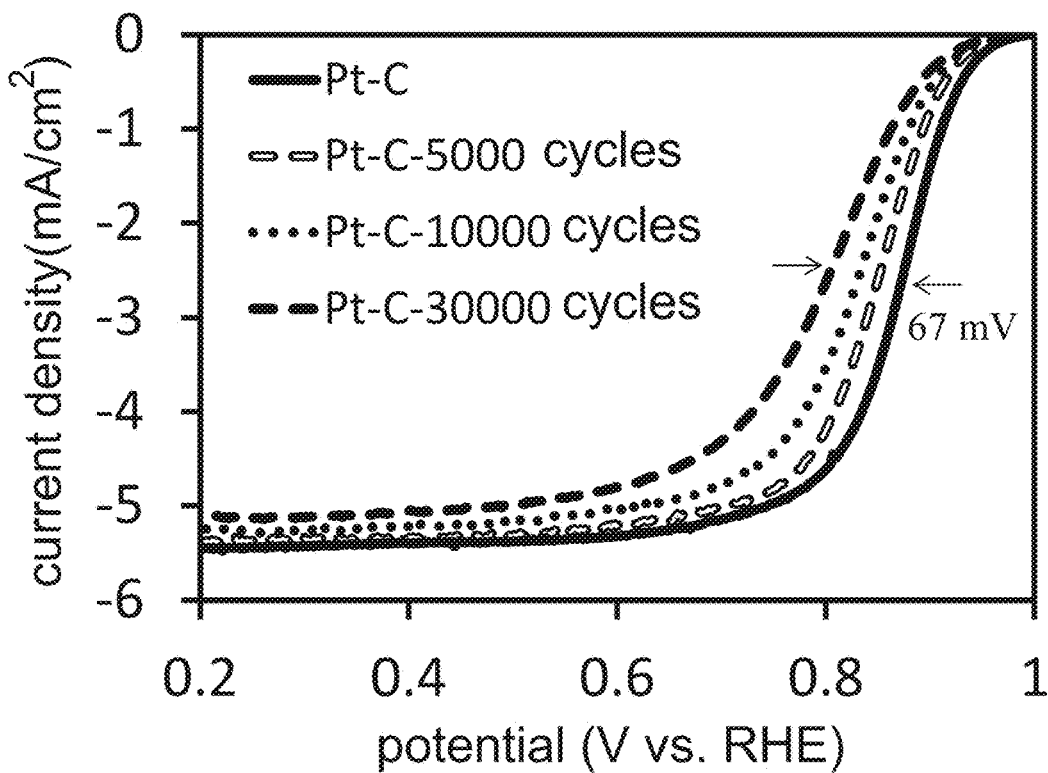
Figure 7:
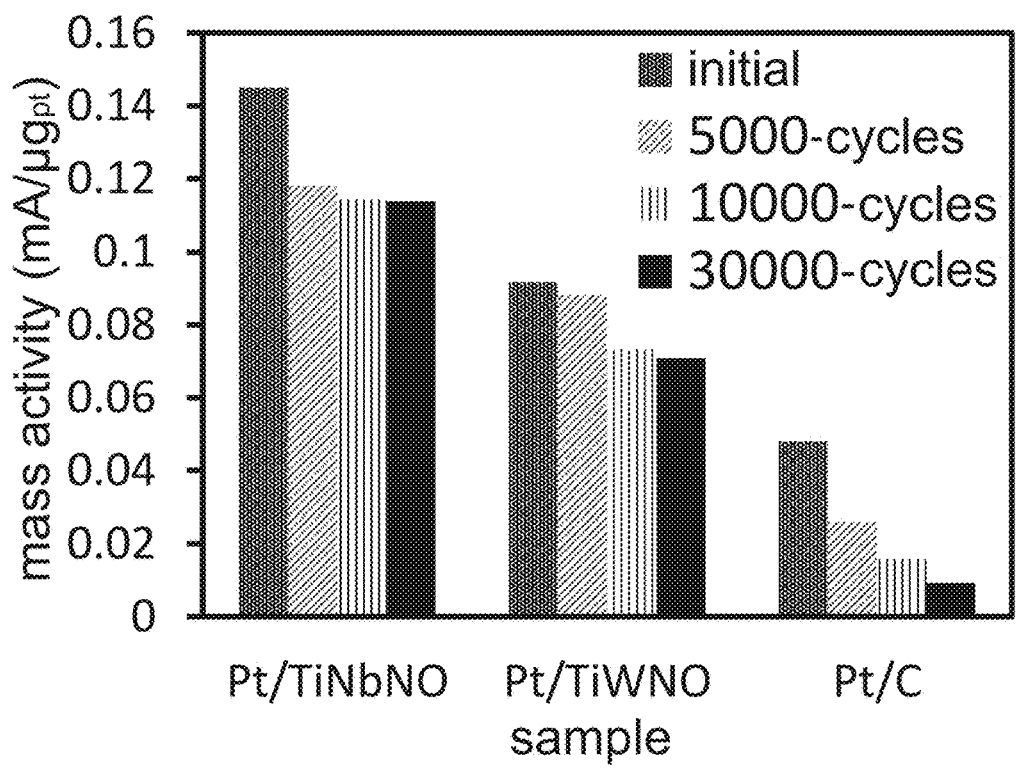

Then, electrochemical test is performed. Among them, in addition to provide $Pt/Ti_{0.8}W_{0.2}N_yO_Z$, $Pt/Ti_{0.9}Nb_{0.1}N_yO_Z$, $Pt/TiN_yO_Z$, $Pt/Ti_{0.8}W_{0.2}O_Z$, and $Pt/Ti_{0.9}Nb_{0.1}O_Z$, Pt/C (platinum catalyst distributed on the carbon support) is further provided for comparison and refer to FIGS. 2 to 7. From the oxygen reduction reaction polarization curve in FIG. 2, it is clear that the order of increase of the half-wave potential ($E_{1/2}$) is: $Pt/TiN_yO_Z$ (referred to as Pt/TiNO in the figure)<$Pt/Ti_{0.8}W_{0.2}O_Z$ (referred to as Pt/TiWO in the figure)<$Pt/Ti_{0.9}Nb_{0.1}O_Z$ (referred to as Pt/TiNbO in the figure)<Pt/C<$Pt/Ti_{0.8}W_{0.2}N_yO_Z$ (referred to as Pt/TiWNO in the figure)<$Pt/Ti_{0.9}Nb_{0.1}N_yO_Z$ (referred to as Pt/TiNbNO in the figure), which shows that the oxygen reduction activities of $Pt/Ti_{0.8}W_{0.2}N_yO_Z$ and $Pt/Ti_{0.9}Nb_{0.1}N_yO_Z$ were remarkably improved. That is, the addition of anions significantly improves the oxygen reduction reactivity. The mass activity (0.9 V) was calculated on the basis of the oxygen reduction reaction polarization curve as shown in FIG. 3. The mass activity of $Pt/Ti_{0.8}W_{0.2}N_yO_Z$ is 2.6 times that of $Pt/Ti_{0.8}W_{0.2}O_Z$, 2.7 times that of $Pt/TiN_yO_Z$, and almost twice that of Pt/C. The increase in catalytic activity was also observed for Pt/Ti$_{0.9}$Nb$_{0.1}$N$_Y$O$_Z$. Therefore, we can see from the electrochemical results, the metal cations and anions are co-doped in TiO$_2$, and the catalyst layer material can effectively enhance the oxygen reduction reaction activity.

Further, FIGS. 4 to 7 are comparative graphs of the stability analysis of the catalyst layer materials of Pt/Ti$_{0.8}$W$_{0.2}$N$_Y$O$_Z$, Pt/Ti$_{0.9}$Nb$_{0.1}$N$_Y$O$_Z$ and Pt/C. Among these, the catalyst layer materials were in oxygen-saturated 0.1 M perchloric acid and were scanned for 5000, 10000 and 30000 cycles by cyclic voltammetry. From the results, the stability of Pt/Ti$_{0.8}$W$_{0.2}$N$_Y$O$_Z$ (whose half-wave potential changes only 5 mV after 30,000 sweeps) and the stability of Pt/Ti$_{0.9}$Nb$_{0.1}$N$_Y$O$_Z$ (whose half-wave potential changes only 4 mV after 30,000 sweeps) are far greater than that of Pt/C (whose half-wave potential changes 67 mV after 30,000 sweeps). Also, from FIG. 7, it can be observed that the mass activity of Pt/Ti$_{0.8}$W$_{0.2}$N$_Y$O$_Z$ and the mass activity of Pt/Ti$_{0.9}$Nb$_{0.1}$N$_Y$O$_Z$ decrease only slightly with the increase of the number of scanning cycles. However, the mass activity of Pt/C decreases drastically with the increase of scanning cycles. The above results show that the catalyst layer materials of the present disclosure have high activity and stability.

Afterwards, the completed catalyst layer material can be applied to a membrane electrode assembly (MEA) of a fuel cell, for example, three-layer or five-layer membrane electrode assembly. The preparation method of the three-layer membrane electrode assembly is mainly that the catalyst layer is directly supported by the polymer membrane, and the preparation method of the five-layer membrane electrode assembly mainly supports the catalyst layer with the gas diffusion layer. Hereinafter, three-layer and five-layer membrane electrode assembly will be described respectively using the structure shown in FIG. 1 as an example.

In one embodiment, the three-layer membrane electrode assembly can be fabricated by, for example, uniformly coating the catalyst layer material, including the catalyst support 102a and the catalyst 102b, on two opposite sides of the polymer membrane 30. Then, hot pressing is performed so that the first catalyst layer 102 and the second catalyst layer 202 are transferred to the polymer film 30. After the membrane electrode is completed, the first gas diffusion layer 101 and the second gas diffusion layer 201 are pressing-formed by a hot pressing method. In another embodiment, the five-layer membrane electrode assembly can be manufactured by, for example, uniformly coating a catalyst layer material, including the catalyst support 102a and the catalyst 102b, on the first gas diffusion layer 101 and the second gas diffusion layer 201. After the first catalyst layer 102 and the second catalyst layer 202 are formed on the first gas diffusion layer 101 and the second gas diffusion layer 201 by being dried, the first gas diffusion layer 101 and the second gas diffusion layer 201 are laminated with the polymer film 30 by hot pressing. It is noted that no matter what kind of membrane electrode assembly is used, the catalyst 102b in the catalyst layer needs to be supported on the catalyst support 102a to facilitate coating the catalyst 102b (and the catalyst support 102a) on the polymer membrane 30, the first gas diffusion layer 101 or the second gas diffusion layer 201.

It is noted that, compared with the conventional oxides synthesized by the conventional solid state method, where the particle size often does not provide a sufficient surface area, the fabricating method of the embodiment of the present disclosure utilizes the hydrothermal method to synthesize an oxide support of several nanometers in size as a non-carbonaceous support, thereby significantly improving the surface area of the catalyst support and contributing to increasing its dispersibility and loading of the supported catalysts. In addition, the catalyst layer material of the embodiment of the present disclosure is manufactured by the hydrothermal method so as to form a porous material without using a pore-forming particle, a surfactant, or a porous silicon template, thereby simplifying the process steps and reducing the manufacturing costs.

From above, the catalyst layer material and the membrane electrode assembly including the same of the present disclosure have at least the following advantages:

1. The catalyst layer material and the membrane electrode assembly including the same of embodiments of the present disclosure include a non-carbonaceous catalyst support with high stability, so as to avoid the problem of corrosion of the conventional carbonaceous support and thereby improving the stability and performance of the fuel cell.
2. The catalyst layer material of embodiments of the present disclosure and the catalyst support of the fuel cell are doped with the metal elements with high electrical conductivity and anions, and have nano-scale size and porous materials and other characteristics. Therefore, it can be developed into an oxide support system with high electrical conductivity and high surface area.
3. The catalyst layer material and the membrane electrode assembly including the same of embodiments of the present disclosure can have relatively good electrochemical performance due to the catalyst support having a relative high electrical conductivity and a relatively low mass transfer resistance.
4. In the catalyst layer material and the membrane electrode assembly including the same of embodiments of the present disclosure, the electronic interaction between the catalyst (platinum or platinum alloy) and the catalyst support can be better utilized to achieve the purpose of enhancing the catalytic activity, since the anion and the cation are co-doped in TiO$_2$ as a catalyst support.

The present disclosure has been described with a preferred embodiment thereof and it is understood that many changes and modifications to the described embodiment can be carried out without departing from the scope and the spirit of the disclosure that is intended to be limited only by the appended claims.

What is claimed is:

1. A catalyst layer material for a fuel cell, comprising:
   a catalyst support comprising Ti$_W$M$_X$N$_Y$O$_Z$, wherein Ti is titanium; M is one metal element selected from a group consisting of group IB metals, group IIA metals, group IIB metals, group VB metals, group VIB metals, group VIIB metals and group VIIIB metals; N is a non-metal element selected from a group consisting of nitrogen, phosphorus, and sulfur; O is oxygen; $0<W\leq1$; $0<X\leq0.5$; $0<Y\leq0.2$; $1.5\leq Z\leq2.0$; and
   a catalyst distributed on the catalyst support.

2. The catalyst layer material according to claim 1, wherein W=1-X.

3. The catalyst layer material according to claim 2, wherein Ti$_W$M$_X$N$_Y$O$_Z$ comprises Ti$_{0.8}$W$_{0.2}$N$_Y$O$_Z$ or Ti$_{0.9}$Nb$_{0.1}$N$_Y$O$_Z$.

4. The catalyst layer material according to claim 1, wherein the group IB metals are selected from a group consisting of copper, silver, and gold; the group IIA metal is strontium; the group IIB metals are selected from a group consisting of zinc and cadmium; the group VB metal is niobium; the group VIB metals are selected from a group consisting of chromium, molybdenum, and tungsten; the group VIIB metals are selected from a group consisting of manganese, technetium, and rhenium; and the group VIIIB metals are selected from a group consisting of iron, ruthenium, osmium, cobalt, rhodium, iridium, nickel, and palladium.

5. The catalyst layer material according to claim 1, wherein the catalyst comprises platinum or a platinum alloy.

6. A membrane electrode assembly for a fuel cell, comprising:
   a first gas diffusion layer and a second gas diffusion layer;
   a first catalyst layer and a second catalyst layer both disposed between the
   first gas diffusion layer and the second gas diffusion layer, wherein at least one of the first gas diffusion layer and the second gas diffusion layer comprises a catalyst layer material comprising:
      a catalyst support comprising $Ti_WM_XN_YO_Z$, wherein Ti is titanium; M is one metal element selected from a group consisting of group IB metals, group IIA metals, group IIB metals, group VB metals, group VIB metals, group VIIB metals and group VIIIB metals; N is a non-metal element selected from a group consisting of nitrogen, phosphorus, and sulfur; O is oxygen; $0<W\leq 1$; $0<X\leq 0.5$; $0<Y\leq 0.2$; $1.5\leq Z\leq 2.0$; and
      a catalyst distributed on the catalyst support; and
      a polymer film disposed between the first catalyst layer and the second catalyst layer.

7. The membrane electrode assembly according to claim 6, wherein W=1-X.

8. The membrane electrode assembly according to claim 7, wherein $Ti_WM_XN_YO_Z$ comprises $Ti_{0.8}W_{0.2}N_YO_Z$ or $Ti_{0.9}Nb_{0.1}N_YO_Z$.

9. The membrane electrode assembly according to claim 6, wherein the group IB metals are selected from a group consisting of copper, silver, and gold; the group IIA metal is strontium; the group IIB metals are selected from a group consisting of zinc and cadmium; the group VB metal is niobium; the group VIB metals are selected from a group consisting of chromium, molybdenum, and tungsten; the group VIIB metals are selected from a group consisting of manganese, technetium, and rhenium; and the group VIIIB metals are selected from a group consisting of iron, ruthenium, osmium, cobalt, rhodium, iridium, nickel, and palladium.

10. The membrane electrode assembly according to claim 6, wherein the catalyst comprises platinum or a platinum alloy.

* * * * *